Nov. 28, 1939.  C. D. BONSALL  2,181,115
HATCH CONSTRUCTION
Original Filed April 13, 1936  2 Sheets-Sheet 1
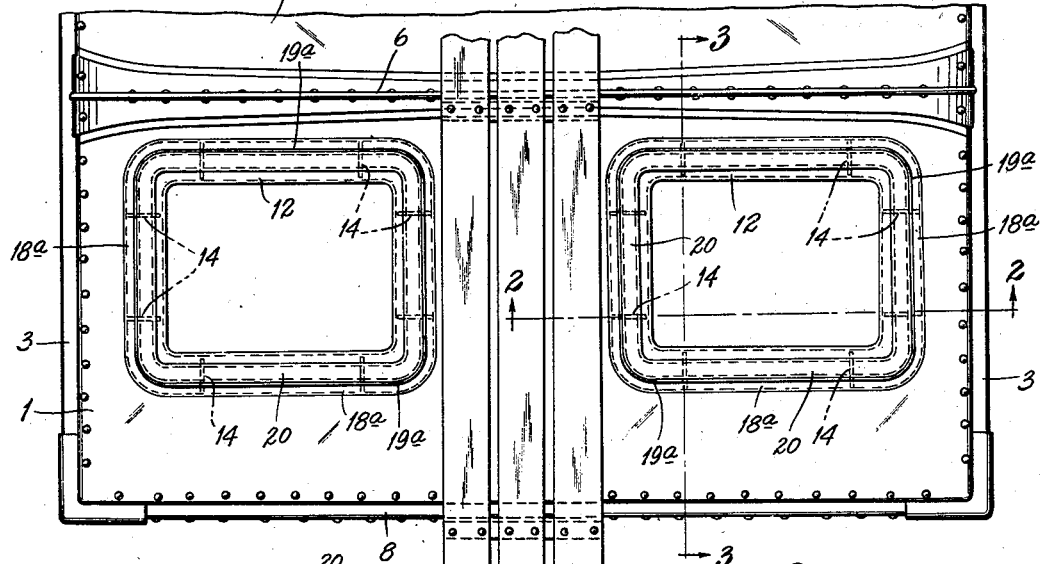
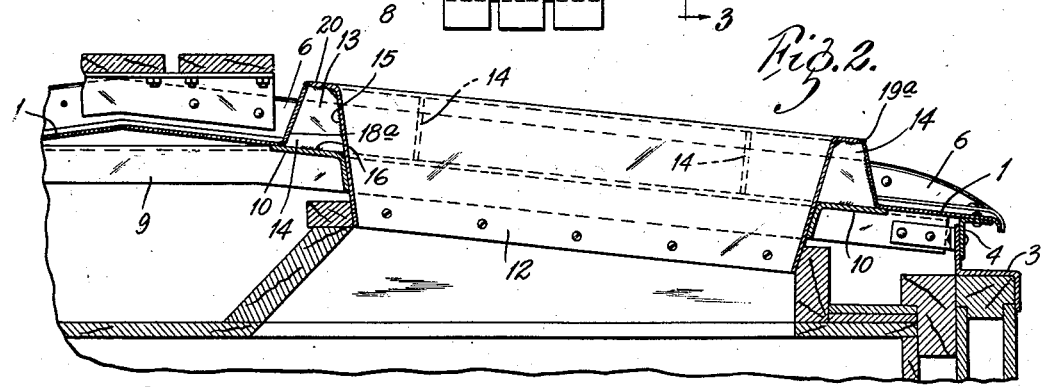
INVENTOR:
Charles David Bonsall
by Cavitt Cavitt Gravely
HIS ATTORNEYS.

Nov. 28, 1939. C. D. BONSALL 2,181,115
HATCH CONSTRUCTION
Original Filed April 13, 1936 2 Sheets-Sheet 2
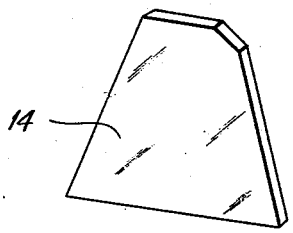
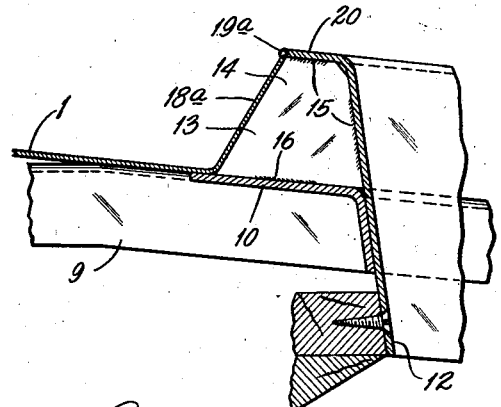
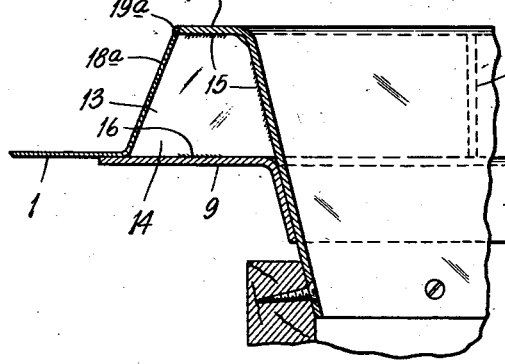
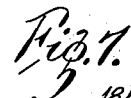
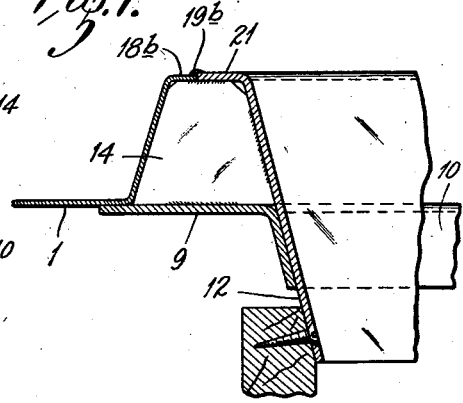
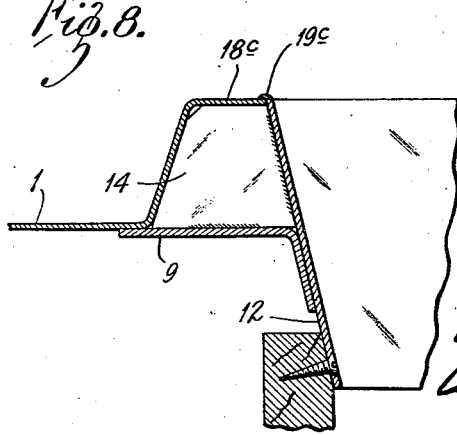
INVENTOR:
Charles David Bonsall
HIS ATTORNEY.

Patented Nov. 28, 1939

2,181,115

UNITED STATES PATENT OFFICE 2,181,115

HATCH CONSTRUCTION

Charles David Bonsall, Pittsburgh, Pa., assignor, by mesne assignments, to Standard Railway Equipment Manufacturing Company, a corporation of Delaware Original application April 13, 1936, Serial No. 74,218. Divided and this application November 20, 1937, Serial No. 175,723

9 Claims. (Cl. 108—5.4)

The subject matter hereof is divided out of my application Serial No. 74,218, filed April 13, 1936, for patent for Hatch construction.

The invention relates to the hatch construction of a metal car roof. It has for its principal objects to devise a strong and durable hatch construction of simple, economical and weatherproof construction and to attain other advantages hereinafter appearing. The invention consists in the hatch construction and in the combinations and arrangements of parts hereinafter described and claimed.

In the accompanying drawings, which form part of this specification and wherein like symbols refer to like parts wherever they occur, Fig. 1 is a plan view of the end portion of a car roof provided with a hatch construction embodying my invention, Fig. 2 is a vertical partial transverse section through the roof on the line 2—2 of Fig. 1, Fig. 3 is a vertical partial longitudinal section through the roof on the line 3—3 of Fig. 1, Fig. 4 is a perspective view of one of the plates for reinforcing and stiffening the hollow rim portion of the metal hatch frame, Fig. 5 is an enlarged fragmentary section similar to Fig. 2 through one side of the hatchway, Fig. 6 is an enlarged fragmentary section similar to Fig. 3 through one side of the hatchway; and Figs. 7 and 8 are views similar to Fig. 6 illustrating two modified forms of hatch construction.

In Figs. 1 to 6 of the accompanying drawings, my invention is shown in connection with a metal refrigerator car roof comprising end and intermediate roof sheets 1 and 2, respectively, that extend from side plate 3 to side plate 3 of the car with their eaves ends resting on and riveted or otherwise rigidly secured to the outstanding top flanges of eaves angles 4, whose depending flanges are riveted or otherwise rigidly secured to the upstanding inner side flanges of said side plates. The roof sheets are provided along their adjacent margins with upstanding flanges 5 that are straddled by a seam cap 6 that is riveted or otherwise secured to said flanges and to the top flanges of the eaves angles 4. At the end of the car, the end roof sheet 1 is supported on and riveted or otherwise rigidly secured to the outstanding top flange of an end angle 7, whose depending inner side flange is riveted or otherwise rigidly secured to the upstanding inner side flange of an end plate 8.

The roof is provided with one or more hatchways that lead downwardly into the interior of the car through the end sheet and a framework located therebelow. Said framework comprises spaced parallel frame or carline members 9 that extend from side plate to side plate with their ends rigidly secured thereto and themselves supporting spaced cross frame members 10. The carline members and cross members preferably comprise oblique metal angles arranged with their tops flush and with their sides converging downwardly.

Each hatchway is provided with a hopper-shaped metal hatch frame 12 that extends downwardly through the opening defined by the frame members 9 and 10 with its downwardly converging sides resting flatwise against the inclined sides thereof. The hatch frame 12 also extends upwardly above the general level of the roof into an opening provided therefor in the end sheet 1 where it cooperates with an upstanding flange 18a along the margin of said opening to form an exterior, downwardly opening hollow rim 13 around the upper portion of said hatch frame. The hollow rim 13 around the metal hatch frame is preferably reinforced and stiffened along its four sides by means of upright plates 14 that rest upon the tops of the angle iron frame members 9 and 10 and extend upwardly into said rim and have a snug fit therein. The plates 14 are welded, as at 15, along their edges to the portions of the hatch frame in contact therewith and are also tack-welded, as at 16, at their lower edges to the tops of the frame members 9 and 10.

In the construction shown in Figs. 1 to 6, the upper end of the metal hatch frame 12 is provided with a mere outstanding flange 20; and the upstanding flange 18a along the margin of the opening in the hatch sheet has its upper edge disposed substantially flush with the underside of said outstanding flange. The roof sheet flange and hatch sheet flange are secured together by a weld 19a of added metal that extends along the adjacent edges of said flanges.

In the modified construction shown in Fig. 7, the top flange 21 of the metal hatch frame is made narrower than the top flange 20 of the hatch frame shown in Fig. 6; and the upstanding hatch sheet flange is provided at its top with an inwardly extending portion 18b that abuts edgewise against the outer edge of the hatch frame flange. The hatch frame flange and roof sheet flange are rigidly secured together by a weld 19b of added metal that extends along the tops of said flanges above the joint therebetween.

In the modified construction shown in Fig. 8, the metal hatch frame is made without a top flange and the hatch sheet flange has an inwardly extending portion 18c at its upper end that is disposed flush with the upper edge of said hatch frame and abuts edgewise against the side thereof. The metal hatch frame and roof sheet flange are secured together by a weld 19c of added metal that covers the joint therebetween.

The hatch construction hereinbefore described has numerous advantages. The cross plates in the hollow rim around the upper portion of the metal hatch frame serve as ties and struts for preventing distortion thereof; and they also afford means for welding the hatch frame to the supporting framework therefor. The metal hatch frame can be applied to the car with the framework as a separate unit, or it may be welded to the framework after the latter is applied to the car. The hatch sheet can be removed without removing the hatch frame; and, likewise, the hatch frame can be removed without removing the hatch sheet.

What I claim is:

1. A hatch construction for a car roof comprising a metal roof sheet having a hatch opening therein and an upstanding flange along the margin of said opening, a metal hatch frame disposed in said opening and cooperating with said flange to form a hollow rim around said hatch frame, said flange and said hatch frame having their upper edges disposed substantially in the same plane, and a continuous weld for securing the upper edges of said hatch frame and said flange together.

2. A hatch construction for a car roof comprising a metal roof sheet having a hatch opening therein and an upstanding flange along the margin of said opening, a metal hatch frame disposed in said opening and cooperating with said flange to form a hollow rim around said hatch frame, said flange and said hatch frame having their upper edges disposed substantially in the same plane, a continuous weld of added metal securing the upper edges of said frame and said flange together, and upright plates spaced apart around said rim and welded edgewise thereto.

3. A hatch construction for a car roof comprising a metal roof sheet having a hatch opening therein and an upstanding flange along the margin of said opening, a metal hatch frame disposed in said opening and cooperating with said flange to form a hollow downwardly opening rim around said hatch frame, one of said flange and hatch frame terminating at its top in a laterally extending flange disposed substantially flush with the top of the other and secured edgewise thereto by a continuous weld of added metal, and web plates rigid with said roof and disposed in said hollow rim crosswise thereof and welded thereto.

4. A hatch construction for a car roof comprising a metal roof sheet having a hatch opening therein and an upstanding flange along the margin of said opening, a metal hatch frame disposed in said opening and cooperating with said flange to form a hollow downwardly opening rim around said hatch frame, said hatch frame having an outstanding flange at its upper end, and a weld securing the outer edge of said outstanding flange to the upper edge of said upstanding flange.

5. A hatch construction for a car roof comprising a metal roof sheet having a hatch opening therein and an upstanding flange along the margin of said opening, a metal hatch frame disposed in said opening and cooperating with said flange to form a hollow downwardly opening rim around said hatch frame, said hatch frame having an outstanding flange at its upper end, a weld securing the outer edge of said outstanding flange to the upper edge of said upstanding flange, and upright plates disposed in and welded to said rim crosswise thereof.

6. A hatch construction for a car roof comprising a metal roof sheet having a hatch opening therein and an upstanding flange along the margin of said opening, a metal hatch frame disposed in said opening and cooperating with said flange to form a hollow downwardly opening rim around said hatch frame, said flange having an inwardly extending portion at the top thereof and said hatch frame having an outstanding flange at its upper end that extends along the edge of the inwardly extending portion of said upstanding flange, and a weld of added metal extending continuously along the tops of said flanges above the joint therebetween.

7. A hatch construction for a car roof comprising a metal roof sheet having a hatch opening therein and an upstanding flange along the margin of said opening, a metal hatch frame disposed in said opening and cooperating with said flange to form a hollow downwardly opening rim around said hatch frame, said flange having an inwardly extending portion at the top thereof and said hatch frame having an outstanding flange at its upper end that extends along the edge of the inwardly extending portion of said upstanding flange, a weld of added metal extending continuously along the tops of said flanges above the joint therebetween, and upright plates disposed in and welded to said rim crosswise thereof.

8. A hatch construction for a car roof comprising a metal roof sheet having a hatch opening therein and an upstanding flange along the margin of said opening, a metal hatch frame disposed in said opening and cooperating with said flange to form a downwardly opening rim around said hatch frame, said upstanding flange having an inwardly extending portion at its upper end that is disposed substantially flush with the upper edge of said hatch frame and abuts edgewise against the side thereof, and a weld of added metal extending continuously along the upper surfaces of said hatch frame and said inwardly extending portion of said flange above the joint therebetween.

9. A hatch construction for a car roof comprising a metal roof sheet having a hatch opening therein and an upstanding flange along the margin of said opening, a metal hatch frame disposed in said opening and cooperating with said flange to form a downwardly opening rim around said hatch frame, said upstanding flange having an inwardly extending portion at its upper end that is disposed substantially flush with the upper edge of said hatch frame and abuts edgewise against the side thereof, a weld of added metal extending continuously along the upper surfaces of said hatch frame and said inwardly extending portion of said flange above the joint therebetween, and upright plates disposed in and welded to said rim crosswise thereof.

CHARLES DAVID BONSALL.